(12) United States Patent
Yeung et al.

(10) Patent No.: US 7,503,067 B2
(45) Date of Patent: Mar. 10, 2009

(54) PRESET SECURITY LEVELS

(75) Inventors: Mike Yeung, Mission Viejo, CA (US); Amir Shahindoust, Languna Niguel, CA (US); Girish R. Krishna, Torrance, CA (US)

(73) Assignees: Toshiba Corporation (JP); Toshiba Tec Kabushiki Kaisha (JP)

( * ) Notice: Subject to any disclaimer, the term of this patent is extended or adjusted under 35 U.S.C. 154(b) by 641 days.

(21) Appl. No.: 10/770,985

(22) Filed: Feb. 2, 2004

(65) Prior Publication Data

US 2005/0172146 A1 Aug. 4, 2005

(51) Int. Cl.
- G06F 7/04 (2006.01)
- G06F 7/58 (2006.01)
- G06F 12/00 (2006.01)
- G06F 12/14 (2006.01)
- G06F 13/00 (2006.01)
- G06F 17/30 (2006.01)
- G06K 19/00 (2006.01)
- G11C 7/00 (2006.01)
- H04L 9/32 (2006.01)

(52) U.S. Cl. ...................................................... 726/17

(58) Field of Classification Search ................. 713/200, 713/167, 166, 165; 726/22
See application file for complete search history.

(56) References Cited

U.S. PATENT DOCUMENTS

| | | | |
|---|---|---|---|
| 5,077,795 A * | 12/1991 | Rourke et al. ................. | 380/55 |
| 5,182,705 A | 1/1993 | Barr et al. | |
| 5,355,414 A * | 10/1994 | Hale et al. ...................... | 726/34 |
| 5,557,515 A | 9/1996 | Abbruzzese et al. | |
| 5,819,091 A | 10/1998 | Arendt et al. | |
| 5,958,051 A | 9/1999 | Renaud et al. | |
| 6,041,315 A * | 3/2000 | Pollin .......................... | 705/45 |
| 6,206,666 B1 | 3/2001 | Imanishi et al. | |
| 6,292,798 B1 | 9/2001 | Dockter et al. | |
| 6,366,912 B1 * | 4/2002 | Wallent et al. ................. | 707/9 |
| 6,442,696 B1 | 8/2002 | Wray et al. | |
| 6,513,111 B2 | 1/2003 | Klimaczak et al. | |
| 6,643,783 B2 | 11/2003 | Flyntz | |
| 2002/0001307 A1 * | 1/2002 | Nguyen et al. ............... | 370/386 |
| 2002/0013908 A1 | 1/2002 | Nishihata et al. | |
| 2002/0023227 A1 * | 2/2002 | Sheymov et al. ............. | 713/201 |
| 2002/0091975 A1 * | 7/2002 | Redlich et al. ............... | 714/699 |
| 2002/0099952 A1 | 7/2002 | Lambert et al. | |
| 2002/0147924 A1 | 10/2002 | Flyntz | |
| 2003/0051054 A1 | 3/2003 | Redlich et al. | |
| 2003/0070097 A1 | 4/2003 | Kappel et al. | |

(Continued)

FOREIGN PATENT DOCUMENTS

JP 2002-262139 9/2002

*Primary Examiner*—Emmanuel L Moise
*Assistant Examiner*—Nadia Khoshnoodi
(74) *Attorney, Agent, or Firm*—Tucker Ellis & West LLP

(57) ABSTRACT

A preset security level system and a method for utilizing the preset security level system. The system includes a plurality of security levels, each of which enables a different level of security. Each of the security levels has associated therewith security features, such that low security level features are associated with a low security level, etc. The system and method enable a system administrator to select a desired security level, which selection automatically results in the activation of the associated security features, rather than manually activate each desired security feature.

15 Claims, 3 Drawing Sheets

U.S. PATENT DOCUMENTS

| | | |
|---|---|---|
| 2003/0119484 A1 | 6/2003 | Adachi et al. |
| 2003/0120610 A1 | 6/2003 | Hamber |
| 2003/0120949 A1 | 6/2003 | Redlich et al. |
| 2003/0182435 A1 | 9/2003 | Redlich et al. |
| 2003/0187932 A1 | 10/2003 | Kennedy |
| 2003/0229524 A1 | 12/2003 | Reuveni |
| 2003/0236996 A1 | 12/2003 | Himmel et al. |
| 2003/0237006 A1 | 12/2003 | Himmel et al. |

* cited by examiner

PRESET SECURITY LEVELS

BACKGROUND OF THE INVENTION

The present invention is directed to a system and method for securing devices, and more particularly, the present invention relates to a preset security level system and a method for using the preset security level system.

Conventionally, computer systems, including peripheral devices, frequently include a plurality of security features for providing a more secure operation of the system or device. Such security features typically include port closing features, Telnet deactivation features, SSL activation features, intrusion detection system activation features, etc. Some of these features provide a low level of security, such as the port closing features, while other features provide a high level of security, such as the intrusion detection system activation feature. When a system administrator wants to activate a certain level of security, the administrator must manually activate each security feature associated with a particular security level. This can be a tedious and time-consuming process, as the number of security features needed to be activated can be large. Thus, there is a need for a preset security level system and method for using the same.

Additionally, performance and security are usually viewed as features highly desirable for data processing peripherals, such as printers and multifunction peripherals. Security-sensitive users, such as government agency employees, health care organization employees, etc., require a peripheral having a high degree of security, but are typically less demanding regarding the performance of the peripheral. Typical users demand a great deal of performance, but have little regard for security. Most peripheral device manufacturers attempt to satisfy these divergent needs by offering a dual line of products, those having enhanced security features and those having enhanced performance features. However, this is an inefficient approach, as a user is not presented with a single peripheral device embodying both features—security and performance. Thus, it is desirable to have a system and method whereby a peripheral device, such as a multifunction peripheral, will embody both increased security and performance features.

SUMMARY OF THE INVENTION

In accordance with the present invention, there is provided a preset security level system and method for using the preset security level system.

In accordance with one aspect, the present invention provides a preset security level system for a peripheral device. The system includes at least one security feature adapted to provide secure operation of the peripheral device; at least one selectable security level, wherein the at least one security level has associated therewith at least one security feature, such that an activation of the security level causes activation of the associated security feature; means adapted for receiving data representative of a selection of a security level; and means, responsive to the received security level selection, adapted for activating the selected security level.

In accordance with another aspect, the present invention provides a method for utilizing a preset security level system to be operable in a peripheral device. The method includes the steps of receiving data representative of a selection of at least one security level, wherein the at least one security level has associated therewith at least one security feature, such that an activation of the security level causes activation of the associated security feature, and wherein the at least one security feature is adapted to provide secure operation of the peripheral device; and activating, in response to the received security level selection, the selected security level.

BRIEF DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE INVENTION

Disclosed according to the present invention is a peripheral device-oriented preset security level system and a method for using the preset security level system. The system generally includes at least one administrator-selectable security level, the selection of which causes features associated with the peripheral device to operate according to the selected security level. The system additional includes at least one security feature associated with the at least one security level. In operation, the system and method enable an administrator to select a desired level of security and thereby activate security features associated with the selected security level. Because the security features that provide a certain level of security have already been associated with the security level, the administrator is not required to manually activate all the security features that correspond to a desired security level. Such a system allows for flexibility in security level while allowing the peripheral to operate at a peak performance level.

Figure 1:
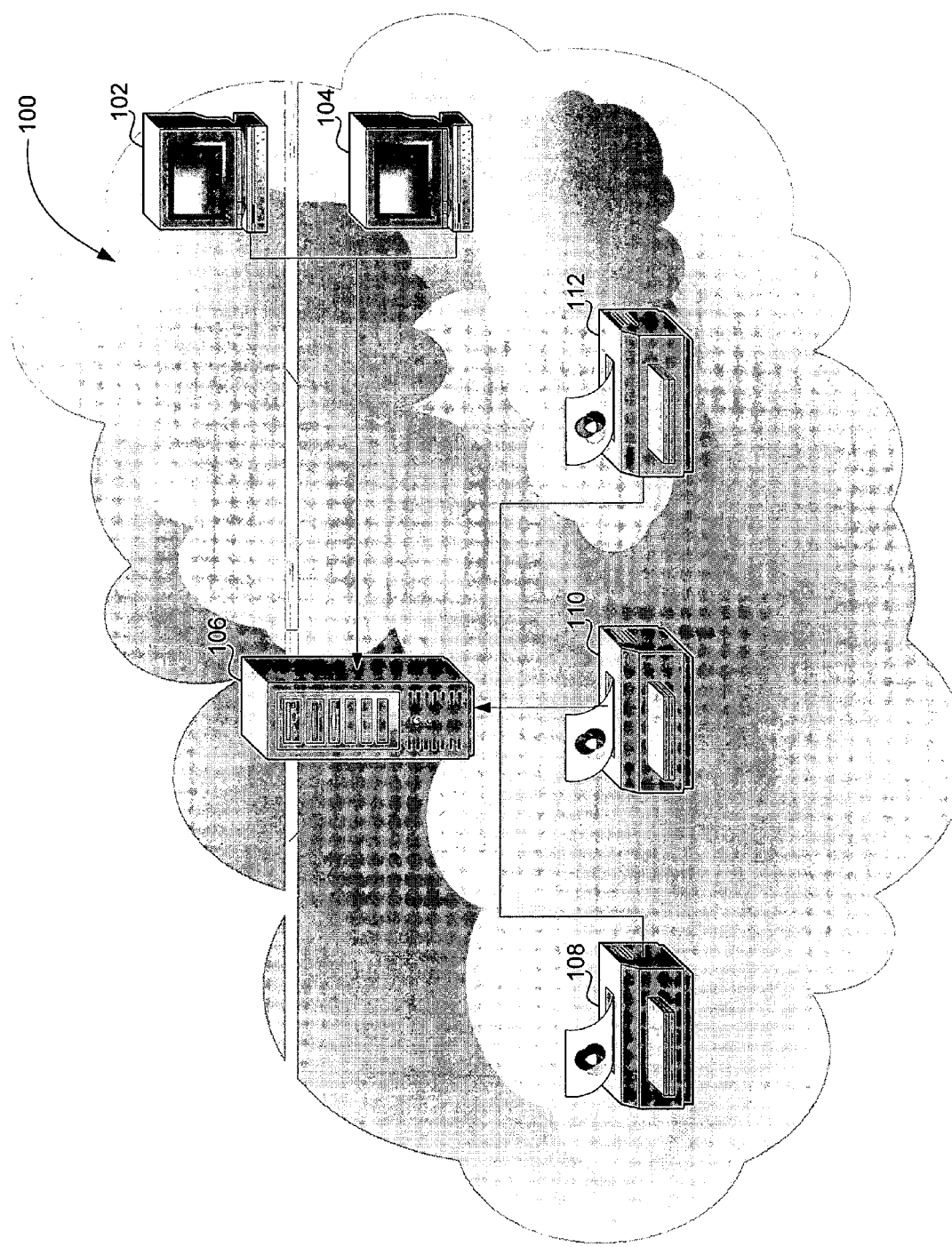
FIG. 1 is a schematic illustration of an example architecture for implementing the present invention.

With reference to FIG. 1, illustrated is an example system architecture 100 for implementing the preset security level system and method. The architecture 100 suitably includes at least one computer terminal 102, 104, at least one server 106, and at least one peripheral device 108, 110, 112, all interconnected through a network. The system and method are adapted to enable secure operation of a peripheral device through the activation of security features. The peripheral device is any suitable device, such as a copier, a printer, a multifunction peripheral, etc. The system is adapted to be accessible to the administrator through one of the computer terminals 102, 104, through the server 106, through the peripheral device 108, 110, 112 itself (through, for example, a control screen associated with the peripheral device), etc. Thus, for example, an administrator suitably selects a security level for the peripheral device 108 through the computer terminal 102. Additionally, the system is adapted to enable the administrator to select a security level to be operable in a plurality of peripheral devices. Thus, for example, the administrator suitably accesses the system through the computer terminal 102, 104, through the server 106, or other suitable means, and suitable selects a security level to be operable in peripheral device 108, peripheral device 110 and peripheral device 112.

Figure 2:
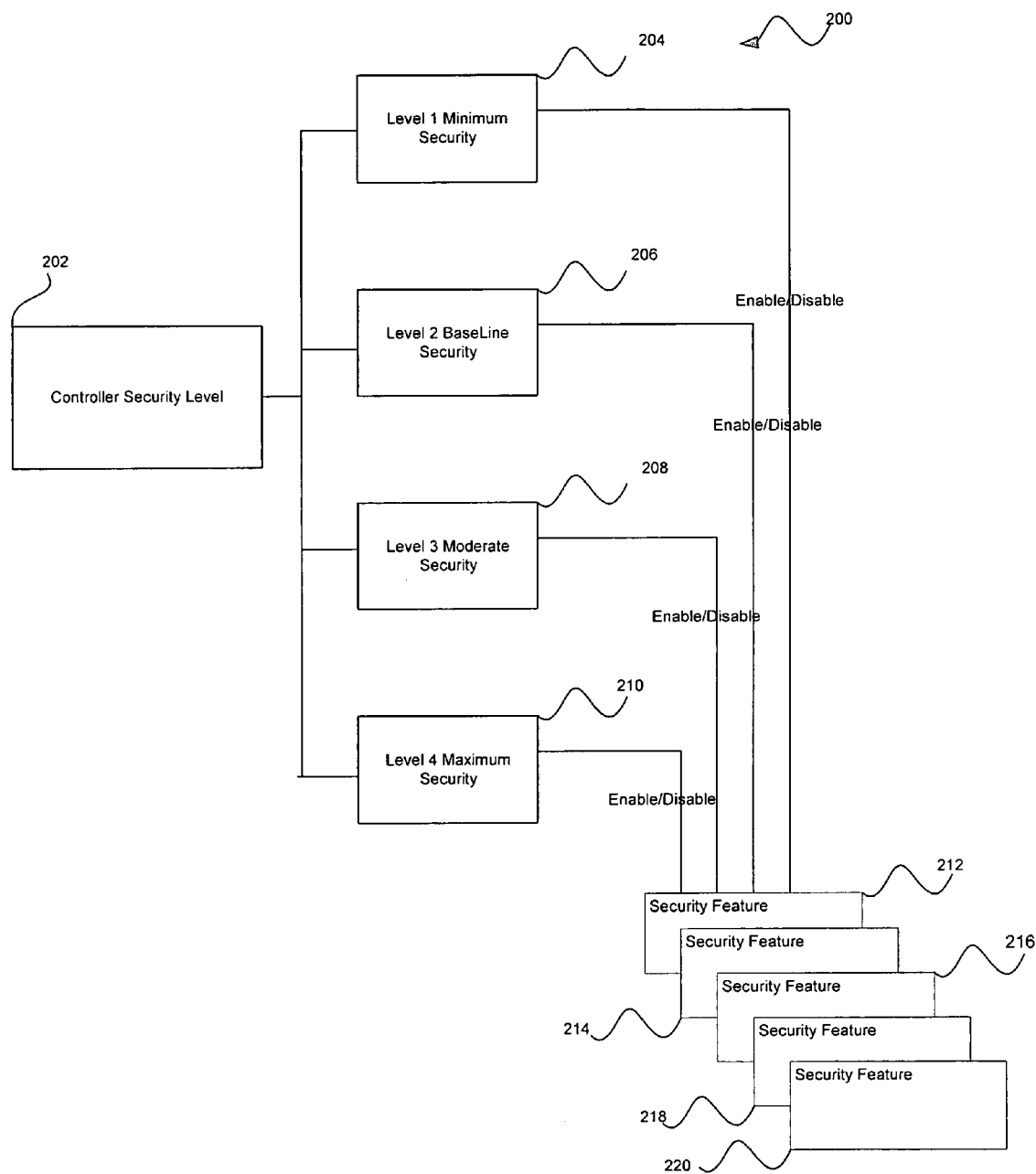
FIG. 2 is a block diagram illustrating an example configuration of the preset security level system of the present invention.

With reference to FIG. 2, the preset security level system 200 generally includes at least one security level and at least one security feature associated with the at least one security level. According to an example embodiment, the system includes a plurality of security levels, such as a first security level 204, a second security level 206, a third security level

208, a fourth security level 210, etc. Each security level suitably enables a different level of secure operation of the peripheral. For example, the first security level 204 suitably enables minimum security, the second security level 206 suitably enables baseline security, the third security level 208 suitably enables moderate security, the fourth security level 210 suitably enables maximum security, etc. Thus, each security level suitably corresponds to a progressively more secure level of operation for the peripheral.

Each security level corresponds to a level of security due to at least one associated security feature. With further reference to FIG. 2, each security level is associated with at least one security feature. With reference to an example embodiment discussed above, the first security level 204 suitably enables a minimum level of security. Accordingly, the first security level 204 is suitably associated with minimum security level security features including, but not limited to, disabling Telnet, disabling a keyboard, disabling video services, closing any and all unnecessary ports, etc. The second security level 206 suitably enables a baseline security. Accordingly, the second security level 206 is suitably associated with baseline security level security features including, but not limited to, using SSL (Secure Sockets Layer), activating user authentication, using role-based access control, minimizing shared folder use, activating job log protection, enabling secure erase (e.g., image overwrite), encrypting user data, etc. The third security level 208 suitably enables a moderate level of security. Accordingly, the third security level 208 is suitably associated with moderate security level security features including, but not limited to, enabling secure print, secure fax, secure scan, secure copy, enabling access control, enabling non-repudiation, etc. The fourth security level 210 suitably enables a maximum level of security. Accordingly, the fourth security level 210 is suitably associated with maximum security level security features including, but not limited to, enabling logging for auditing purposes, activating antiviral protections, etc.

Each of the security levels suitably operates as a progressively more secure level, such that the second security level 206 incorporates all of the security features of the first security level 204 and adds additional security features, and the third security level 208 incorporates all of the security features of the second security level 206 (and thereby the first security level 204) and adds additional security features, etc. Additionally, one or more of the security levels suitably has associated therewith such security features so as to be compatible with an ISO (International Organization for Standardization) standard, such as ISO 15408.

Figure 3:
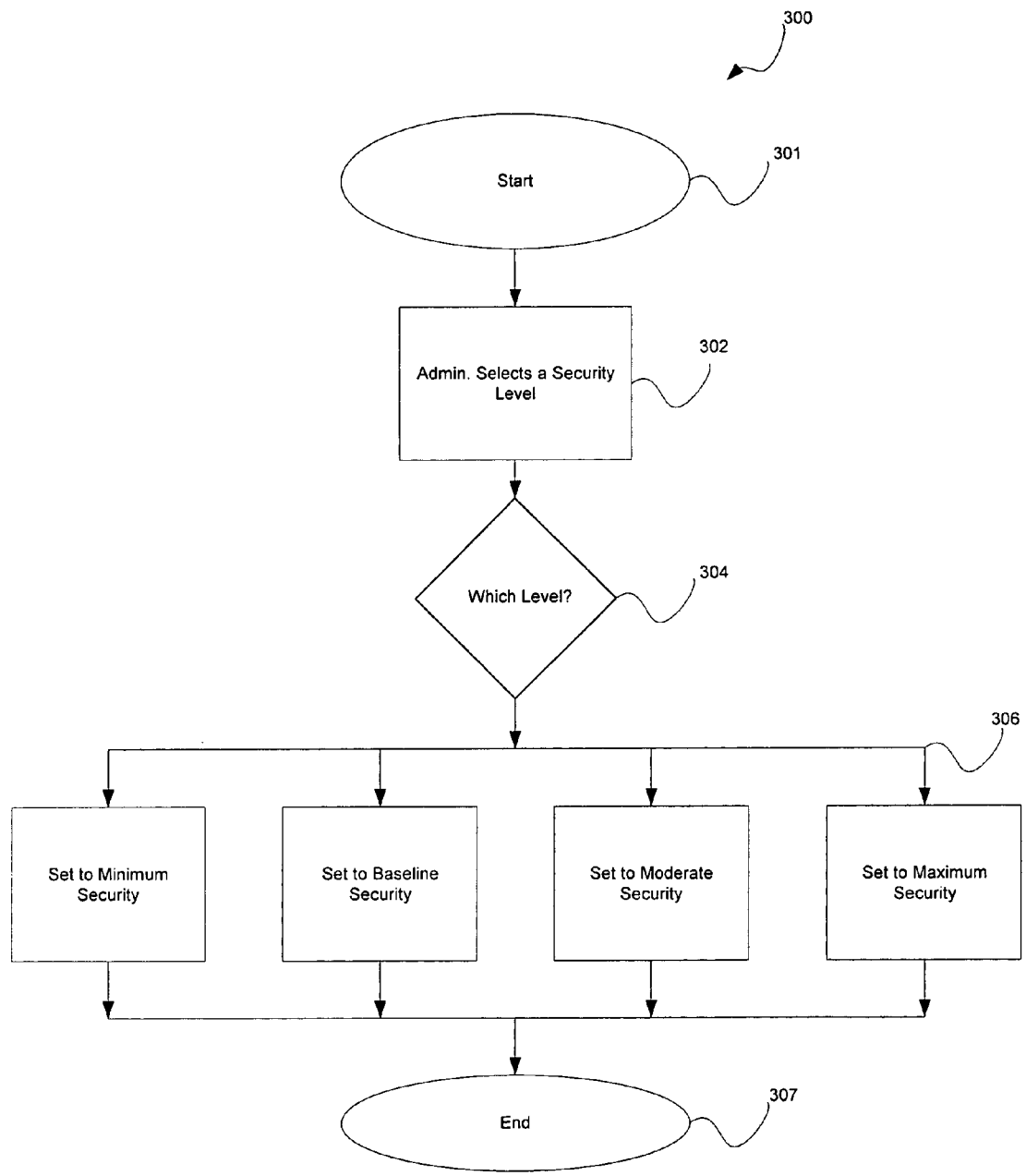
FIG. 3 is a flow chart illustrating an example method for using the preset security level system of the present invention.

Turning to FIG. 3, illustrated is an example method 300 for using the preset security level system of the present invention. According to this example, a user, such as a system administrator, first accesses the security system (step 301) through any suitable means as discussed above. Upon so accessing, the administrator is suitably presented with the option of selecting at least one of the preset security levels (step 302). Thereupon, the administrator will select the desired security level at step 304. Upon selecting the desired security level, the desired security level will be activated (step 306). For example, if the administrator selects the first security level, the security features associated with the first security level will be activated. Thereafter, the activated security features will enable the desired level of security for the peripheral.

According to an example embodiment, the administrator will be provided with an option to deselect a selected security level. Accordingly, the system and method are further adapted to enable the administrator to manually deselect a security level or to enable the administrator to specify an event, the passage of which will cause the selected security level to be automatically deselected. For example, the administrator suitably may specify that the security level is to be deselected after a certain time duration or upon the completion of a certain job.

Although the preferred embodiments have been described in detail, it should be understood that various changes, substitutions and alterations can be made therein without departing from the spirit and scope of the invention as defined by the appended claims. It will be appreciated that various changes in the details, materials and arrangements of components, which have been herein described and illustrated in order to explain the nature of the invention, may be made by those skilled in the art within the principle and scope of the invention as will be expressed in the appended claims.

What is claimed is:

1. A preset security level system for a document processing system comprising:

a memory, the memory configured for storing security level data representative of a plurality of nested security levels selectively available to multiple classes of users of an associated document processing system having a plurality of device functions, including copying, scanning and printing, the document processing system including security features adapted to provide secure operation thereof, wherein the security levels are hierarchically oriented from a lower security level to a higher security level, wherein each higher security level incorporates all security features of each security level lower thereto, and wherein, a lower security level including selective enablement of the device functions, selective encryption of electronic data, and at least one of open ports, Telnet functionality, device feature activation and video transmission, an intermediate security level including cryptographic communication protocol usage, user authentication, role-based access control, shared folder control, job logging, and secure data erasure, and a higher security level including enabling at least one of session logging, activation of antiviral procedures, and auditing;

association means configured for associating each selectable security level with feature data representative of a plurality of security features, such that an activation of each security level causes activation of the plurality of security features associated therewith;

means configured for receiving, from an administrator, data representative of a selected security level for selective association with each of a plurality of users of the document processing system;

means, responsive to the received security level selection, configured for activating the selected security level;

means configured for receiving, from a user, operation instructions for operation of the document processing system;

means configured for limiting operation of the associated document processing system in accordance with a security level of each associated user;

means configured for receiving event data corresponding to completion of a preselected event, wherein the preselected event is at least one of completion of a document processing operation and passage of a selected time period; and means configured for altering the selected security level in accordance with received event data.

2. The system of claim 1, wherein the at least one selectable security level comprises a first security level, and wherein the first security level has associated therewith at least one of a Telnet deactivation security feature, a keyboard deactivation security feature and a video services deactivation feature.

3. The system of claim 2, wherein the at least one security level further comprises a second security level, and wherein the second security level has associated therewith at least one of an SSL activation security feature, an authentication activation security feature, a role-based access control activation security feature, a shared folders minimizing security feature, a job log protection activation security feature, a secure erase enabling security feature and a user data encryption security feature.

4. The system of claim 3, wherein the at least one security level further comprises a third security level, and wherein the third security level has associated therewith at least one of a secure print security feature, a secure fax security feature, a secure scan security feature, a secure copy security feature and a PDF security feature.

5. The system of claim 4, wherein the at least one security level further comprises a fourth security level, and wherein the fourth security level has associated therewith at least one of a logging and auditing security feature, an antivirus protection enabling security feature, and an intrusion detection system activation security feature.

6. A method for using preset security levels in a document processing system comprising the steps of:
storing, in a document processing system having a plurality of device features, including copying, scanning, and printing, and including security features adapted to provide secure operation thereof, security level data representative of a plurality of nested security levels selectively available to multiple classes of users of an associated document processing system in an associated memory, wherein the security levels are hierarchically oriented from a lower security level to a higher security level, wherein each higher security level incorporates all security features of each security level lower thereto, and wherein
a lower security level including selective enablement of device functions, selective encryption of electronic data, and at least one of open ports, Telnet functionality, device feature activation and video transmission,
an intermediate security level including cryptographic communication protocol usage, user authentication, role-based access control, shared folder control, job logging, and secure data erasure, and
a higher security level including enabling at least one of session logging, activation of antiviral procedures, and auditing;
associating each selectable security level with feature data representative of a plurality of security features, such that an activation of each security level causes activation of the plurality of security features associated therewith;
receiving, from an administrator, data representative of a selected security level for selective association with each of a plurality of users of the document processing system;
responsive to the received security level selection, activating the selected security level;
receiving, from a user, operation instructions for operation of the document processing system;
controlling operation of the associated document processing system in accordance with a security level of each associated user; and
receiving event data corresponding to completion of a preselected event, wherein the preselected event is at least one of completion of a document processing operation and passage of a selected time period; and
altering the selected security level in accordance with received event data.

7. The method of claim 6, wherein the at least one security level comprises a first security level, and wherein the first security level has associated therewith at least one of a Telnet deactivation security feature, a keyboard deactivation security feature and a video services deactivation feature.

8. The method of claim 7, wherein the at least one security level further comprises a second security level, and wherein the second security level has associated therewith at least one of a SSL activation security feature, an authentication activation security feature, a role-based access control activation security feature, a shared folders minimizing security feature, a job log protection activation security feature, a secure erase enabling security feature and a user data encryption security feature.

9. The method of claim 8, wherein the at least one security level further comprises a third security level, and wherein the third security level has associated therewith at least one of a secure print security feature, a secure fax security feature, a secure scan security feature, a secure copy security feature and a PDF security feature.

10. The method of claim 9, wherein the at least one security level further comprises a fourth security level, and wherein the fourth security level has associated therewith at least one of a logging and auditing security feature, an antivirus protection enabling security feature, and an intrusion detection system activation security feature.

11. A computer-implemented method for using preset security levels in a document processing system comprising the steps of:
storing security level data representative of a plurality of nested security levels selectively available to multiple classes of users of an associated document processing system having a plurality of device functions, including copying, scanning, and printing, in an associated memory, the document processing system including security features adapted to provide secure operation thereof, wherein the security levels are hierarchically oriented from a lower security level to a higher security level, wherein each higher security level incorporates all security features of each security level lower thereto, and wherein
a lower security level including selective enablement of device functions, selective encryption of electronic data, and at least one of open ports, Telnet functionality, device feature activation and video transmission,
an intermediate security level including cryptographic communication protocol usage, user authentication, role-based access control, shared folder control, job logging, and secure data erasure, and,
a higher security level including enabling at least one of session logging, activation of antiviral procedures, and auditing;
associating each selectable security level with feature data representative of a plurality of security features, such that an activation of each security level causes activation of the plurality of security features associated therewith;
receiving, from an administrator, data representative of a selected security level for selective association with each of a plurality of users of the document processing system;

responsive to the received security level selection, activating the selected security level;

receiving from a user, operation instructions for operation of the document processing system;

controlling operation of the associated document processing system in accordance with a security level of each associated user; and receiving event data corresponding to completion of a preselected event, wherein the preselected event is at least one of completion of a document processing operation and passage of a selected time period; and altering the selected security level in accordance with received event data.

12. The method of claim 11, wherein the at least one security level comprises a first security level, and wherein the first security level has associated therewith at least one of a Telnet deactivation security feature, a keyboard deactivation security feature and a video services deactivation feature.

13. The method of claim 12, wherein the at least one security level further comprises a second security level, and wherein the second security level has associated therewith at least one of a SSL activation security feature, an authentication activation security feature, a role-based access control activation security feature, a shared folders minimizing security feature, a job log protection activation security feature, a secure erase enabling security feature and a user data encryption security feature.

14. The method of claim 13, wherein the at least one security level further comprises a third security level, and wherein the third security level has associated therewith at least one of a secure print security feature, a secure fax security feature, a secure scan security feature, a secure copy security feature and a PDF security feature.

15. The method of claim 14, wherein the at least one security level further comprises a fourth security level, and wherein the fourth security level has associated therewith at least one of a logging and auditing security feature, an antivirus protection enabling security feature, and an intrusion detection system activation security feature.

* * * * *